United States Patent
Ruth et al.

(10) Patent No.: US 9,676,280 B2
(45) Date of Patent: Jun. 13, 2017

(54) BRAKING MANAGEMENT IN A DUAL BRAKING SYSTEM

(71) Applicant: Caterpillar Inc., Peoria, IL (US)

(72) Inventors: Eric Ruth, Peoria, IL (US); Christopher P. Braet, Washington, IL (US); Alexander C. Crosman, III, Dunlap, IL (US); Jonathan M. Baumann, Hanna City, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/734,795

(22) Filed: Jun. 9, 2015

(65) Prior Publication Data

US 2016/0362006 A1    Dec. 15, 2016

(51) Int. Cl.
| | | |
|---|---|---|
| *B60L 7/26* | (2006.01) | |
| *B60T 7/12* | (2006.01) | |
| *B60T 13/66* | (2006.01) | |
| *B60T 8/172* | (2006.01) | |

(52) U.S. Cl.
CPC ..... *B60L 7/26* (2013.01); *B60T 7/12* (2013.01); *B60T 8/172* (2013.01); *B60T 13/66* (2013.01); *B60T 2201/04* (2013.01)

(58) Field of Classification Search
CPC ............. B60T 7/04; B60T 8/00; B60T 1/02
See application file for complete search history.

(56) References Cited

U.S. PATENT DOCUMENTS

| | | | | |
|---|---|---|---|---|
| 4,351,404 A | * | 9/1982 | Igarashi | B60P 3/42 180/11 |
| 6,076,899 A | * | 6/2000 | Isella | B60L 7/24 188/159 |
| 7,128,376 B2 | * | 10/2006 | Williams | B60T 8/1703 303/15 |
| 7,308,959 B2 | * | 12/2007 | Roberts | B60K 6/48 180/65.31 |
| 7,395,734 B2 | | 7/2008 | Fujiwara et al. | |
| 8,386,131 B2 | | 2/2013 | Thaduvayi et al. | |
| 2003/0025388 A1 | * | 2/2003 | Roether | B60T 8/327 303/15 |
| 2005/0261818 A1 | * | 11/2005 | Brown | B60T 8/1766 701/70 |
| 2005/0283299 A1 | * | 12/2005 | Du | B60K 1/00 701/70 |
| 2006/0108956 A1 | * | 5/2006 | Clark | B60L 3/108 318/139 |
| 2007/0262640 A1 | * | 11/2007 | Szczerba | B60T 1/10 303/113.4 |
| 2011/0233994 A1 | * | 9/2011 | Harding | B60T 1/10 303/152 |

(Continued)

FOREIGN PATENT DOCUMENTS

| | | |
|---|---|---|
| CN | 102963253 B | 3/2013 |
| JP | 2012040964 A | 3/2012 |

*Primary Examiner* — Calvin Cheung
(74) *Attorney, Agent, or Firm* — Miller, Matthias & Hull; Jeffrey A. Greene

(57) ABSTRACT

A system for managing braking torque in a machine uses a first braking system, a second braking system that is independent of the first braking system and a controller that monitors activity in both braking systems. The controller selectively reduces torque in the first braking system as torque in the second braking system increases to limit undesired effects of possible over-braking.

20 Claims, 5 Drawing Sheets

(56) References Cited

U.S. PATENT DOCUMENTS

| | | | |
|---|---|---|---|
| 2011/0257847 A1* | 10/2011 | Uematsu | B60T 8/172 701/48 |
| 2012/0175200 A1* | 7/2012 | Sagan | B60T 1/10 188/159 |
| 2015/0001914 A1 | 1/2015 | Antao et al. | |
| 2015/0151726 A1* | 6/2015 | McClain | B60T 7/042 303/15 |
| 2015/0191159 A1* | 7/2015 | Akamine | B60T 8/1755 701/22 |

* cited by examiner

BRAKING MANAGEMENT IN A DUAL BRAKING SYSTEM

TECHNICAL FIELD

The present disclosure is generally directed to braking in a machine and more particularly to controlling braking via retarding in the presence of mechanical braking initiated by an operator.

BACKGROUND

Some large machines, particularly those associated with mining and other earthmoving operations, use dual braking systems. One configuration of such systems involves the use of an electric retarder, for example, an AC motor configured to generate electricity to slow rotation of an armature of the motor and thereby an axle coupled to the armature. As a backup to the electric motor, a conventional hydraulic braking system may also be installed in the machine. Because braking using a retarding mode in a traction motor provides a high retarding capability and reduces wear in mechanical brakes, the retarder may be the preferred system to use for ordinary braking. In the event of an electrical failure, the hydraulic braking system may also be used to slow or stop the machine.

It follows that both the electric retarder and the hydraulic braking system each have the braking capacity to bring the machine to a full stop in a worst-case operating situation, such as a mining truck with a full payload operating on a downhill grade. However, in a situation where the electric retarder is already supplying some measure of braking force and the hydraulic braking system is activated by an operator, up to double the braking force required to bring the machine to a safe stop can be applied, sometimes with several negative consequences.

First, because the electric retarder is generally mounted on an inboard portion of an axle and the hydraulic brake is generally mounted on an outboard portion of the axle or a wheel, the difference in brake torque between the electric retarder and the hydraulic brake can cause a sudden and excessive torsional shock to the driveline and axle. Second, the brake force can be so strong that the machine's pitch and bounce modes are excited and the rear wheels of the machine may actually jump off the ground and bounce causing at least stress if not damage to tires, wheels, axles, and other drive train components.

With respect to braking system performance management, U.S. Patent Publication 2012/0175200 to Ford Global Technologies discloses a system that allows a user to configure a preferred braking profile and, responsive to a brake pedal position signal, provide brake torque according to the profile. Such a system does not, however, disclose parallel braking systems or the use of a control scheme to manage over-braking.

SUMMARY OF THE DISCLOSURE

In an aspect of the disclosure, a method of adjusting braking torque in a machine having two separate braking systems includes identifying a first condition and activating a first braking system to produce a first brake torque in response to the first condition. The method may include determining that a second braking system is producing a second brake torque and automatically adjusting the first brake torque corresponding to the second brake torque. In an embodiment, the first brake torque is reduced as the second brake torque increases.

In another aspect of the disclosure, a system for managing braking torque in a machine includes a first braking system and a second braking system independent of the first braking system. The system includes a controller that monitors activity in both the first braking system and the second braking system and alters a first braking torque of the first braking system responsive to a change in a second braking torque of the second braking system.

In yet another aspect of the disclosure, a system for managing braking in a machine with independent braking systems includes an electric retarding system coupled to a first location on an axle of the machine, the electric retarder supplying a first brake torque when activated. The system also includes a hydraulic brake coupled to the axle at a second location remote from the first location, the hydraulic brake supplying a second brake torque directly proportional to a position of a foot pedal. The system further includes a controller that controls an amount of braking torque applied by the electric retarder responsive to either recognizing a predetermined condition or a manual setting. The controller is configured to monitor a position of the foot pedal of the hydraulic brake and to reduce the first brake torque of the electric retarder relative to an increase in the second brake torque of the hydraulic brake to reduce axle stress when both the electric retarder and the hydraulic brake are active.

These and other aspects and features will be more readily understood when reading the following detailed description when taken in conjunction with the accompanying drawings.

DETAILED DESCRIPTION

Figure 1:
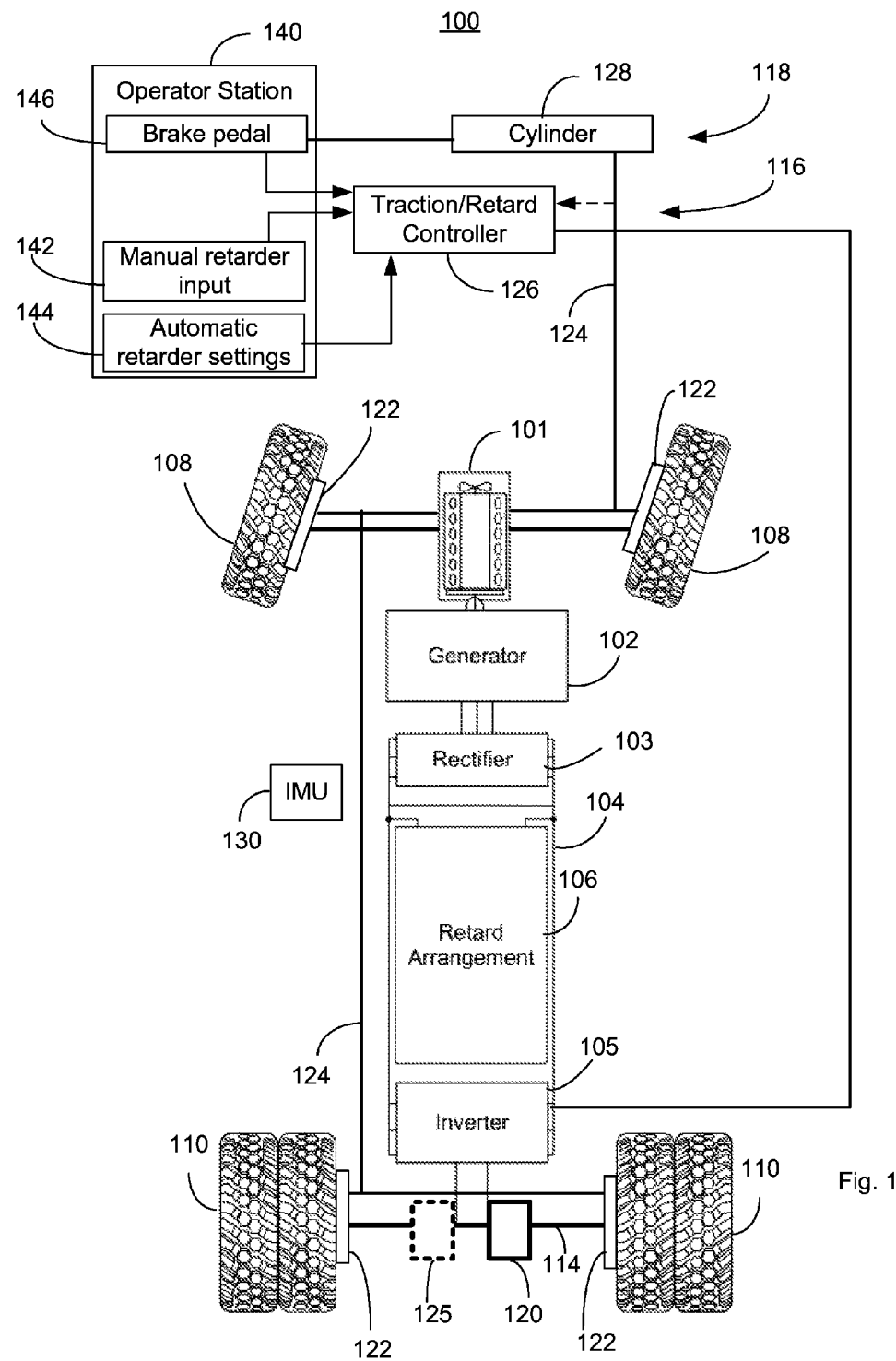
FIG. 1 is a block diagram of a machine having multiple independent braking systems in accordance with the current disclosure.

Referring to FIG. 1 a machine 100 having two or more independent braking systems is illustrated. The machine 100 may be used in any number of applications including construction, mining, or earthmoving, to name a few. The machine 100 may use wheels 108, 110 as illustrated in FIG. 1, may use tracks, or may use a combination of wheels and tracks. For the sake of clarity and without limitation, the following discussion of machine 100 will reference an off-road truck such as one that may be used in the mining industry.

The simplified illustration of the machine 100 shows an engine 101 that transmits power to a generator 102. The generator 102 creates alternating current (AC) electrical energy that is converted to direct current (DC) electrical energy by a rectifier 103. The DC electrical energy is transmitted via a high voltage bus 104 to an inverter 105. The inverter 105 powers an electric motor 120 in a drive mode and captures electric energy generated by the electric motor 120 in retard mode. The energy created in retard mode may be dissipated or stored in a retard arrangement 106. The machine 100 may include a first braking system 116 and a second braking system 118.

The first braking system 116 may use the electric motor 120 in retarding mode coupled to the axle 114. In some embodiments, another electric motor 125 (shown in dashed lines) may be disposed on the other side of the machine 100. The electric motor 120, and electric motor 125 when present, may be an AC motor/generator that converts electrical energy to mechanical energy to drive the wheels 110 in a traction mode and converts mechanical energy in the axle 114 to electrical energy in a retarding mode. The electric motor 120 in retarding mode may be used to slow down the machine 100 or bring it to a complete stop. The electric motor 120 may be controlled by a signal from a controller 126. The first braking system 116 may also include a manual retarder input 142 and an input for automatic retarder settings 144. The second braking system 118 may include a brake pedal 146 and one or more hydraulic cylinders 128 that pressurize fluid in hydraulic brake lines 124.

In an embodiment, the electric motor 120 may be used for braking the machine 100 for several reasons including energy recovery, reduced wear on mechanical brakes, an ability to contour the braking profile, and automatically triggered braking such as entry into a speed zone area. A rate of application of the electric motor 120 may depend on a payload and slope of the machine 100. For example, an empty machine 100 on level ground may require less brake torque than the machine 100 with a payload of 150 tons operating on a steep downhill incline. The use of the electric motor 120 allows setting a given level of brake torque needed, for example, to maintain speed on a downhill incline. As opposed to a hydraulic brake 122 that generates heat with use, the electric motor 120 may, in some embodiments, generate electricity that can be used to charge a battery (not depicted). This stored power can be used to operate fans or other electrical equipment.

The second braking system 118 may include hydraulic brakes 122 that may also be used to slow or stop the machine 100. In an embodiment, the hydraulic brakes 122 are preferably used for emergency stopping when either the electric motor 120 fails or if an operator identifies a hazard requiring immediate action. As discussed more below, the controller 126 may monitor a position of the brake pedal 146 or may optionally receive a hydraulic pressure from a hydraulic brake line 124.

The machine 100 may also include an operator station 140. The operator station 140 may include a manual retarder input 142. In some embodiments, the manual retarder input 142 may be a lever mounted on a steering column near a steering wheel. The operator station 140 may also include automatic retarder settings 144, such as incline-based braking or speed zone braking. The brake pedal 146 may operate in a conventional manner to apply the hydraulic brakes 122 by using a foot to depress the pedal. For the purpose of illustration, hydraulic brake torque will develop to a measureable extent when the brake pedal 146 is at 30% of its range of motion and will reach 100% when the brake pedal 146 is at 100% of its range of motion or fully depressed. An inertial measurement unit 130 (IMU) may be used to detect instantaneous values for acceleration of the machine 100. The use of the IMU 130 is discussed further below.

As discussed above, both the electric motor 120 and the hydraulic brakes 122 are capable of fully stopping the machine 100 within its specified stopping distance at various payloads and angles of operation (inclination). In the illustrated embodiment, the machine 100 may be a dump truck with a payload of about 150 tons. The braking force at a wheel 110 supplied in this exemplary embodiment by either the electric motor 120 in retarding mode or the hydraulic brake 122 may be in a range around 750,000 Newton-meters (Nm). However, in a situation such as a panic stop on a downhill incline, where the electric motor 120 may already be set at 100% braking and an operator fully applies the hydraulic brakes 122 nearly double the braking force may be applied at each wheel. In this situation, the wheels 108 and 110 may stop so quickly that the rear wheels 110 of the vehicle may create an exceedingly high torque spike, causing the machine 100 to pitch or bounce and may cause the tires to momentarily leave the ground, which may result in a lessened amount of control of the machine 100. This action may also potentially damage the wheels 110 and tires of the machine 100 as well as upstream drivetrain components, not to mention alarming the machine operator.

Figure 2:
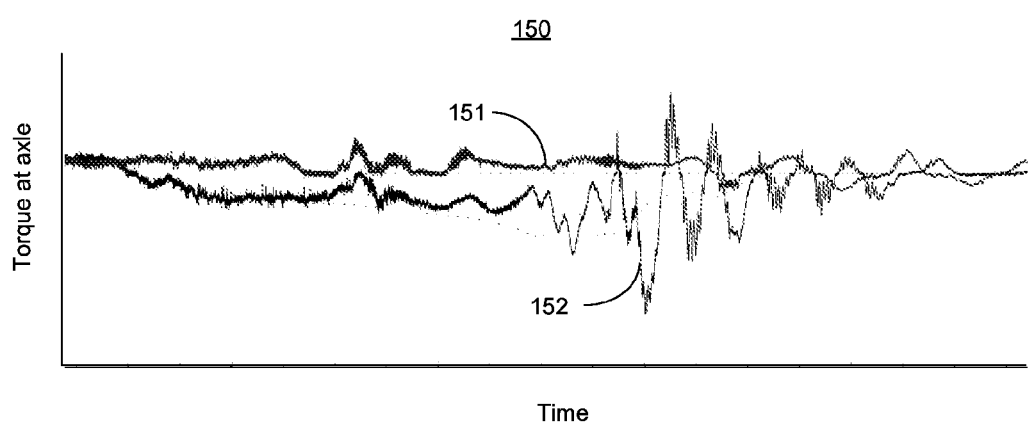
FIG. 2 is a chart illustrating torque at an axle of the machine of FIG. 1.

In addition to the vehicle impact discussed above, another impact area of double braking is illustrated in FIG. 2, where a chart 150 shows exemplary measurements of torque on the axle 114. A first graph 151 illustrates torque on the axle 114 when only the hydraulic brake 122 is applied. A second graph 152 illustrates torque on the axle 114 when both the hydraulic brake 122 and the electric motor 120 are both applied at 100%. Because the hydraulic brake 122 is located at an outboard end of the axle 114 and the electric motor 120 is located at an inboard end of the axle 114, a rate and timing of torque application may be uneven between the axle ends. This can result a torque shock on the axle 114 shown in graph 152. This large wrapup of the axle 114 not only stresses the axle 114 but transmits the shock through to other drivetrain components.

To avoid this torque shock, the controller 126 may monitor a setting of retarding supplied by the electric motor 120 as well as a status of the hydraulic brake 122. When the electric motor 120 is operating in retarding mode, especially at very high levels, and the hydraulic brake 122 is applied, the controller 126 may automatically reduce the brake torque supplied by the electric motor 120.

Table 1 illustrates two different mappings to reduce retarder braking torque as a function of hydraulic braking. In these illustrations, the hydraulic brake (sometimes called the service brake) pedal position as a percent is used as a surrogate for hydraulic brake torque. That is, a 30% depression of the brake pedal 146 is considered as a transition from zero to a positive hydraulic brake torque and 100% brake pedal depression is considered full hydraulic brake torque.

Looking at Table 1 below, two different mappings for electric retarding reduction as a function of hydraulic brake torque are illustrated. To begin in both Map 1 and Map 2, the brake pedal position is at 30% or zero hydraulic brake torque and the electric motor retarding torque level is at 100%, for example, due to either an automatically detected condition or a manual setting of the retarder input 142 in the operator station 140. As the brake pedal position percentage increases, a setting of the level of the electric motor retarding torque is progressively reduced to a final value of 60% for Map 1.

Map 2 of Table 1 illustrates a steeper reduction in electric motor torque as a function of brake pedal position. In this example, the final electric motor retarding torque level is set to only 20% when the brake pedal position is at 100%.

TABLE 1

Representative braking maps for electric motor retarding torque reduction

| Map 1 | Brake Pedal Position % Inputs | 30 | 44 | 58 | 72 | 86 | 100 |
|---|---|---|---|---|---|---|---|
| | Electric motor retarding Lever % Level | 100 | 92 | 84 | 76 | 68 | 60 |
| Map 2 | Brake Pedal Position % Inputs | 30 | 44 | 58 | 72 | 86 | 100 |
| | Electric motor retarding Lever % Level | 100 | 84 | 68 | 52 | 36 | 20 |

Map 1 of Table 1 can be reduced to a simple equation of electric motor torque as a function of brake pedal position. A similar equation could be developed for electric motor torque as a function of hydraulic brake fluid pressure.

(Electric motor retarding torque %)=lesser of 100 or 117−0.57*(brake pedal position %)

Similarly, Map 2 of Table 1 can be reduced to a similar equation.

(Electric motor retarding torque %)=lesser of 100 or 134−1.1*(brake pedal position %)

Figure 3:
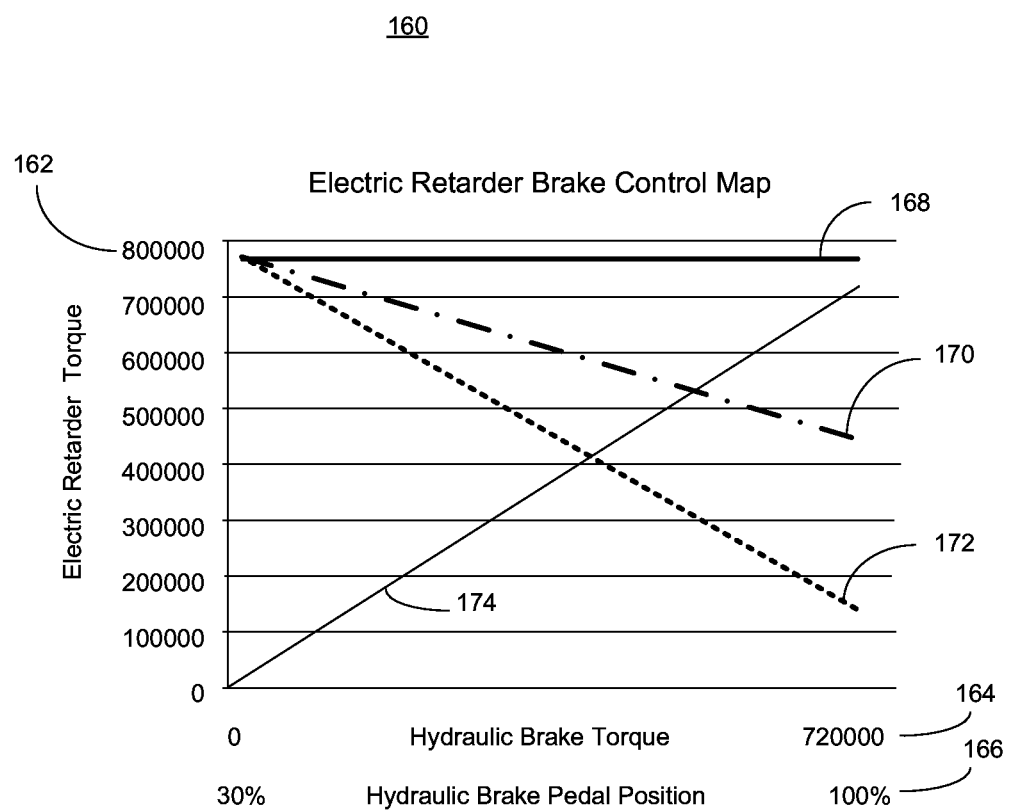
FIG. 3 is a chart of electric retarder torque to hydraulic brake torque in accordance with the current disclosure.

The information in Table 1 is illustrated graphically in FIG. 3, where chart 160 has electric motor retarding torque on the Y axis 162 and hydraulic brake torque on the x-axis 164. A second x-axis 166 is also labeled to illustrate the relationship of hydraulic brake pedal position to hydraulic brake torque, that is 100% brake pedal position is roughly equivalent to 720,000 Nm for the exemplary machine 100. Line 168 illustrates a baseline of electric motor retarding torque at a constant 100%. Line 170 illustrates electric motor retarding torque as a function of hydraulic brake torque for Map 1 and line 172 illustrates electric motor retarding torque as a function of hydraulic brake torque for Map 2. Line 174 plots the increasing hydraulic brake torque.

Table 2 below illustrates the effect on total braking torque at a wheel 110 for the baseline condition and those of the electric motor retarding torque reductions shown in Map 1 and Map 2 above. As can be seen, a 100% condition for both hydraulic braking and electric motor retarding braking is nearly 1.5 million Nm of braking torque, which has been shown to have several undesired consequences. In contrast, Map 2 illustrates that at a 100% brake pedal position the total braking torque at the wheel 110 is only slightly more than either braking system used separately and is unlikely to cause undesirable reactions in the machine 100 or high axle torque. Map 1 illustrates the less dramatic reduction of brake torque from the electric motor 120 but still much less than the baseline.

TABLE 2

| | Brake force capacity | | | | |
|---|---|---|---|---|---|
| | Brake pedal position | Hydraulic Brake Torque at wheel (Nm) | Electrical Brake Torque Percentage | Electrical Brake Torque at wheel (Nm) | Total Braking Torque at wheel (Nm) |
| Baseline | 30% | 0 | 100% | 748000 | 748000 |
| | 100% | 720000 | 100% | 748000 | 1468000 |
| Map1 | 30% | 0 | 100% | 748000 | 748000 |
| | 100% | 720000 | 60% | 448800 | 1168800 |

TABLE 2-continued

| | Brake force capacity | | | | |
|---|---|---|---|---|---|
| | Brake pedal position | Hydraulic Brake Torque at wheel (Nm) | Electrical Brake Torque Percentage | Electrical Brake Torque at wheel (Nm) | Total Braking Torque at wheel (Nm) |
| Map2 | 30% | 0 | 100% | 748000 | 748000 |
| | 100% | 720000 | 20% | 149600 | 869600 |

In an embodiment, the controller 126 may select Map 1, Map 2, or a different map based on conditions at the machine 100, such as, but not limited to, payload, incline angle, and environment information when available, such as ground condition. For example, a rate of adjustment of the first braking torque may decrease as the payload increases, so that additional braking force is available in that situation.

In other embodiments, the controller 126 may use real-time calculations to determine braking adjustments rather than lookup tables. For example, an IMU 130 may sense instantaneous changes in speed of the machine 100. A current value of the electric retarding torque may be determined through monitoring a speed of the electric motor 120 and/or monitoring current and rotor angle values in the electric motor 120. Torque supplied by the second braking system 118, or by another external force, may be calculated by comparing a rate of deceleration vs. that expected due to the only retarding of the electric motor 120. As above, the braking torque supplied by the first brake system 116 may be adjusted to prevent over-braking.

Figure 4:
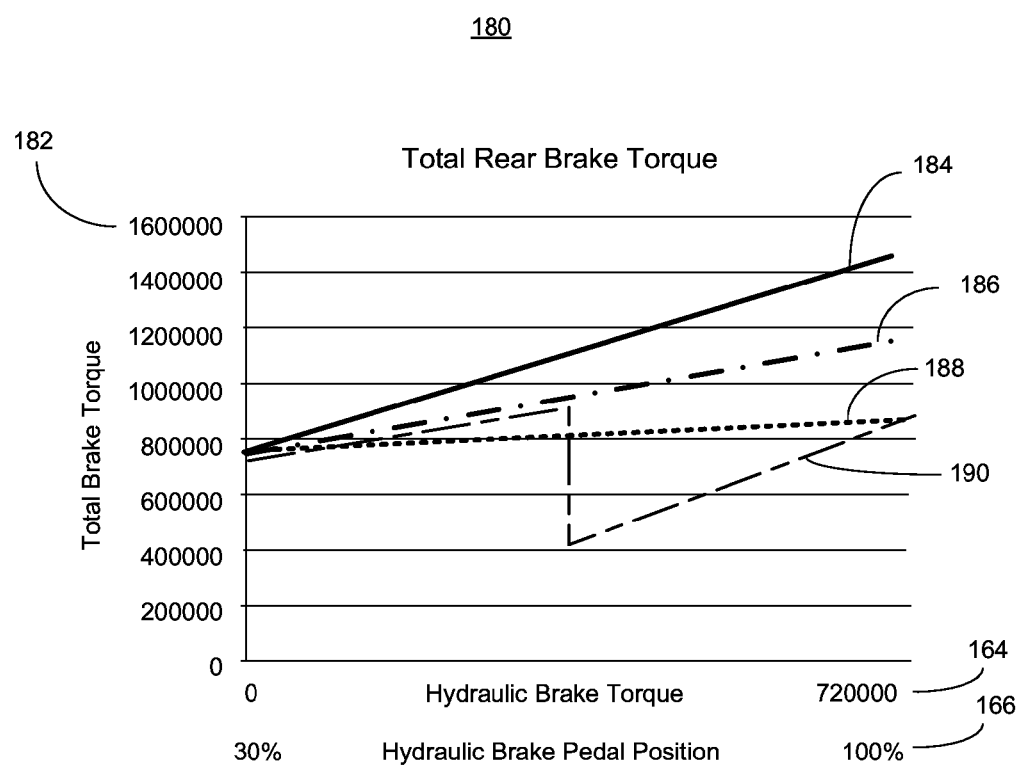
FIG. 4 is a chart of total brake torque to hydraulic brake torque in accordance with the current disclosure.

A chart 180 shown in FIG. 4 illustrates total brake torque 182 as a function of hydraulic brake torque 164 or hydraulic brake pedal position 166. A baseline line 184 represents brake torque with no abatement of the electric motor retarding. Line 186 and line 188 represent the total brake torque when the electric motor retarding is scaled according to Map 1 and Map 2, respectively.

Note that the increase in brake force shown in both lines 186 and 188 need not be linear as depicted and could follow a nonlinear transfer function. It is, however, desirable that the total brake torque increase monotonically, that is, each successive value of total torque is higher than the previous value for each increase in brake pedal position. In this way an operator always feels that the increased depression of the brake pedal results in an increase in brake torque. For example, as shown by line 190, if the electric motor retarding were to be cut from 100% to 0% when the brake pedal position reached 50%, a total brake torque would be dramatically reduced as the hydraulic brake becomes the only source of brake torque. An operator may view this reduction in torque as a brake system failure which might cause some level of panic in the operator, a service call, or both.

INDUSTRIAL APPLICABILITY

In general, the present disclosure can find industrial applicability in a number of different settings. For example, the present disclosure may be employed in braking systems deployed in any machine with a dual braking system. Such machines may be used in a variety of applications, such as, but not limited to those use in the earth-moving, construction, mining, agriculture, transportation, and marine industries.

Figure 5:
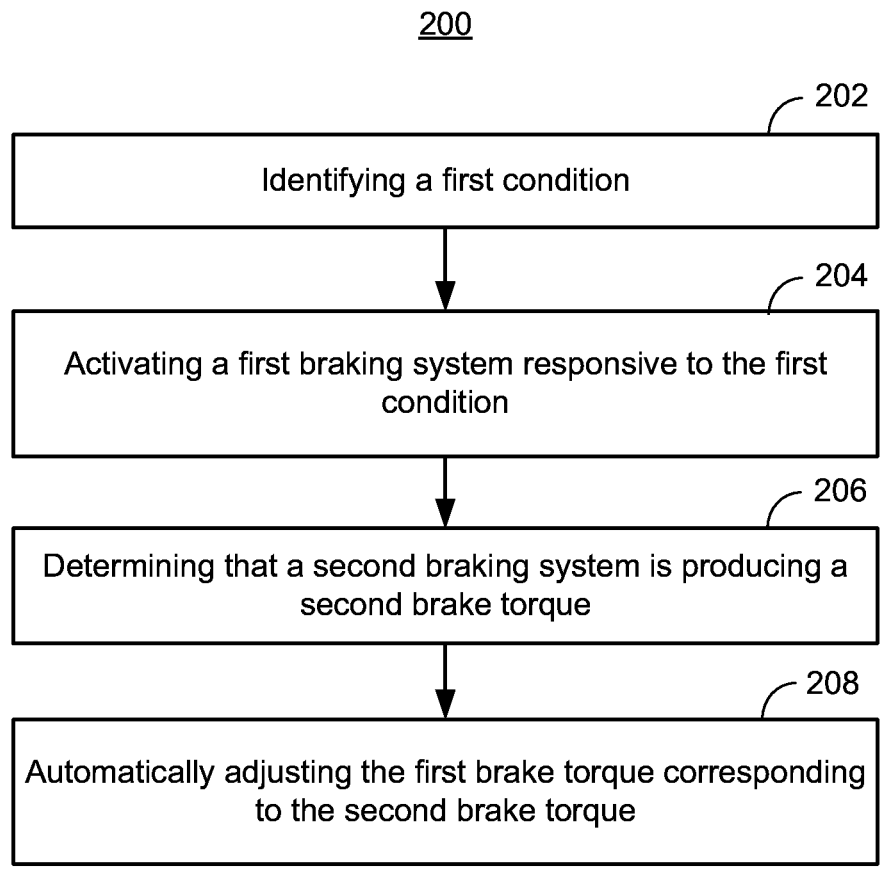
FIG. 5 is a flowchart of an exemplary method of adjusting brake force in a machine having two separate braking systems.

A method 200 of adjusting braking force in a machine 100 having two separate braking systems 116, 118 is depicted in FIG. 5. At block 202, a first condition may be identified. In an embodiment, the first condition may be a signal to activate the first braking system 116 received from a manual retarder input 142 such as a hand lever in an operator station 140. In another embodiment, the first condition may be identification of an operating state that triggers automatic application of the first braking system 116, using, for example, an electric motor 120 operated in a retarding mode. The first condition may be activation of a rule corresponding to a current operating state such as a combination of payload and incline or may be related to a speed limit in a zone in which the machine 100 is currently operating.

At block 204, the first braking system 116 may be activated to produce a first brake torque in response to the first condition.

A determination that a second braking system 118, such as the hydraulic brakes 122, is active and producing a second brake torque may be made at block 206. The determination that the second braking system 118 is active and a magnitude of the braking torque supplied by the second braking system 118 may be made by sensing a position of a brake pedal 146, a change in brake fluid pressure, or monitoring solenoid current in a brake actuator (not depicted).

The first brake torque of the first brake system 116 may be automatically adjusted at block 208 corresponding to the second brake torque supplied by the second braking system 118. The torque of the first braking system 116 may be automatically changed in an inverse relationship to an increase in the torque of the second braking system 118. That is, as the second braking system torque increases the torque in the first braking system 116 is reduced according to a formula or look up table of first braking system torque to second braking system torque. The first braking system torque may be reduced in relation to increases in the second braking system torque to ensure that an overall brake torque applied supplied by both the first and second braking systems 116, 118 monotonically increases. When the first braking system 116, such as electric motor 120, is not at full capacity at the time the hydraulic brake 122 is applied, the controller 126 may determine whether the braking torque provided by the electric motor 120 needs to be reduced or may be maintained at its current level. For example, when the electric motor 120 is at 50% and the application of the hydraulic brake 122 remains at or below 50%, the controller 126 may determine that an appropriate amount of braking force is being applied. However, in other situations such as operating empty (i.e., with no payload) the controller 126 may determine that even with both braking systems at 50%, a risk of axle twist may exist and the retarding torque produced by the electric motor 120 may be reduced accordingly. However, even in this situation, it is desirable to monitor total brake force and ensure that a monotonic increase in total brake force is applied whenever the operator is further depressing the brake pedal 146.

Use of an electric motor 120 to provide braking capacity to a machine 100 provides a more energy-efficient and operator friendly mechanism for providing braking by energy recovery and automated activation in some predetermined circumstances. However, the need to supply a backup hydraulic brake system 118 means that almost double the braking force provided by either braking system 116, 118 may available, such as in a panic stop situation. The ability to automatically reduce the brake torque supplied by an electric motor 120 during a panic stop or other identified condition benefits both the machine operator and the equipment owner. The machine operator is not subjected to the torque shock of both braking systems or the physical pounding caused by such a large vehicle stopping unexpectedly quickly to the point of partially lifting off the ground. The owner of the machine benefits by reduced stress on components and an overall reduction in wear on tires and other drivetrain components, such as axle 114, caused by the torque shock of both braking systems operating at full capacity.

While the above discussion has been directed to a particular type of vehicle, the techniques described above have application to many other machines which is a combination of electrical and mechanical braking.

What is claimed is:

1. A method of adjusting braking torque in a machine having two separate braking systems, the method comprising:
   identifying a first condition;
   activating a first braking system to produce a first brake torque in response to the first condition, wherein the first brake system is positioned on an inboard portion of an axle;
   determining that a second braking system is producing a second brake torque, wherein the second braking system is positioned on an outboard portion of the axle; and
   automatically adjusting the first brake torque corresponding to the amount of second brake torque to control torque shock on the axle.

2. The method of claim 1, wherein the first braking system is an electric motor in a retarding mode.

3. The method of claim 2, wherein the first condition is a signal to activate the first braking system received from a manual control.

4. The method of claim 2, wherein the first condition is an operating state that triggers automatic application of the first braking system.

5. The method of claim 4, wherein the second braking system is a hydraulic braking system.

6. The method of claim 5, wherein determining that the second braking system is producing the second brake torque comprises determining a position of a brake pedal associated with the second braking system.

7. The method of claim 6, further comprising determining an increase in the second brake torque by monitoring a change in position of the brake pedal, wherein the first brake torque is reduced in response to the increase in the second brake torque.

8. The method of claim 5, further comprising determining an increase in the second brake torque by monitoring a pressure in a line of the hydraulic braking system, wherein the first brake torque is reduced in response to the increase in the second brake torque.

9. The method of claim 1, wherein automatically adjusting the first brake torque comprises reducing the first brake torque according to a formula of the second brake torque to the first brake torque.

10. The method of claim 9, wherein automatically adjusting the first brake torque comprises reducing the first brake torque according to a table of the second brake torque to the first brake torque.

11. The method of claim 1, wherein automatically adjusting the first brake torque comprises reducing the first brake torque responsive to an increase in the second brake torque so that overall brake torque monotonically increases as the first brake torque decreases and the second brake torque increases.

12. The method of claim 1, further comprising changing a rate of adjustment in the first brake torque of the first braking system corresponding to a payload of the machine.

13. A system for managing braking torque in a machine, comprising:
- a first braking system positioned on an inboard portion of an axle;
- a second braking system positioned on an outboard portion of an axle and being independent of the first braking system; and
- a controller that
  - monitors activity in both the first braking system and the second braking system and
  - alters a first braking torque of the first braking system responsive to a change in a second braking torque of the second braking system to control torque shock on the axle.

14. The system of claim 13, wherein the first braking system is an electric motor in a retarding mode operating at an inboard end of the axle of the machine and the second braking system is a hydraulic braking system operating at a wheel coupled to an outboard end of the axle.

15. The system of claim 13, wherein the controller is configured to activate the first braking system responsive to one of a signal from an operator or automatically responsive to a condition being met.

16. The system of claim 13, wherein the controller estimates the second braking torque in the second braking system based on one of a brake pedal position or a pressure in a hydraulic brake line of the second braking system.

17. The system of claim 16, wherein the controller reduces the first braking torque using one of a table or a formula for reducing the first braking torque as a function of the estimated second braking torque in the second braking system.

18. The system of claim 17, wherein the controller adjusts a reduction of the first braking torque so that a total braking torque in the machine monotonically increases as long as the estimated second braking torque is increasing.

19. A system for managing braking in a machine with independent braking systems, the system comprising:
- an electric motor coupled to a first location on an axle of the machine, the electric motor supplying a first brake torque when activated;
- a hydraulic brake coupled to the axle at a second location remote from the first location, the hydraulic brake supplying a second brake torque directly proportional to a position of a foot pedal; and
- a controller that
  - controls a braking torque applied by the electric motor responsive to one of recognizing a predetermined condition or a manual setting,
  - the controller further configured to
    - monitor the position of the foot pedal and
    - reduce the first brake torque of the electric motor relative to an increase in the second brake torque of the hydraulic brake to reduce axle stress when both the electric motor and the hydraulic brake are active.

20. The system of claim 19, wherein the controller further uses a payload to determine a rate at which to reduce the braking torque applied by the electric motor when the hydraulic brake is providing the second brake torque.

* * * * *